Figure 3:
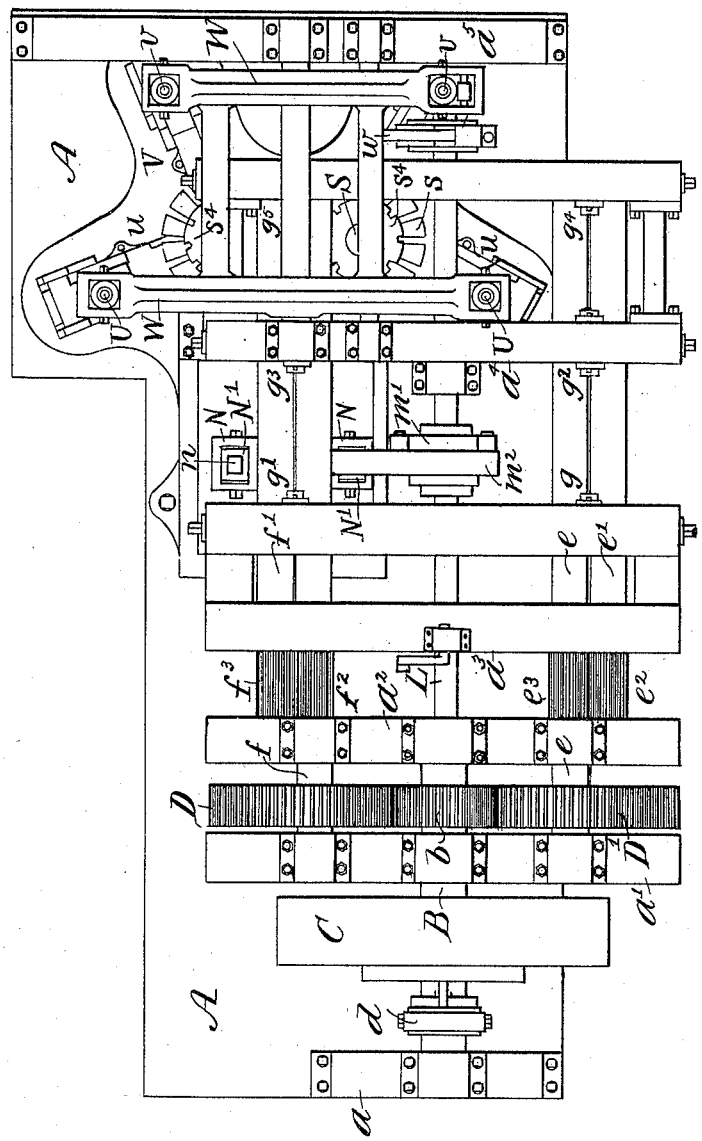

(No Model.) 6 Sheets—Sheet 1.
G. J. CAPEWELL & O. JONES.
HORSESHOE NAIL MACHINE.
No. 584,304. Patented June 8, 1897.
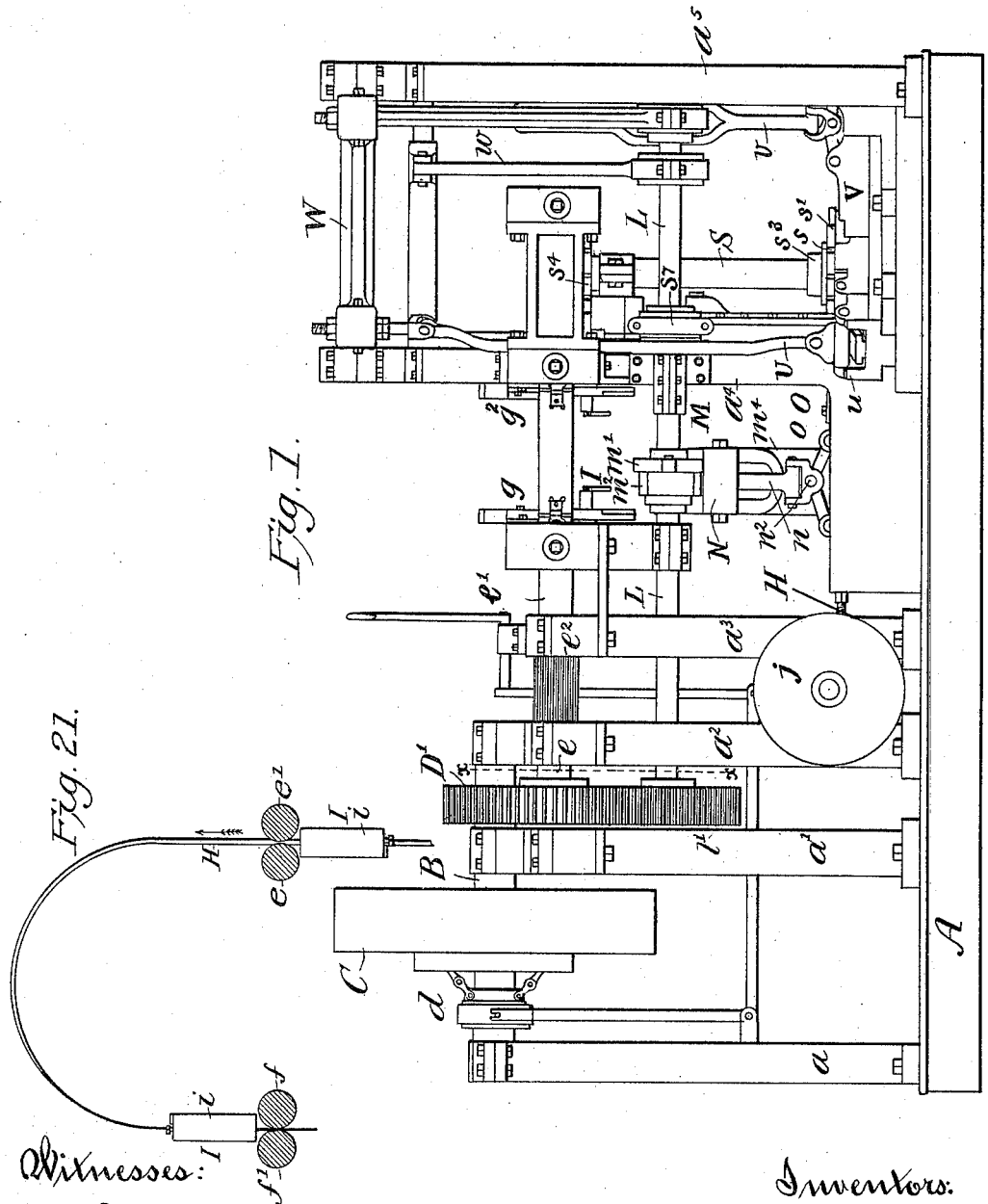
Witnesses:
J. A. Cantin
A. B. Jenkins
Inventors:
George Joseph Capewell
and Owen Jones
By Chas. L. Burdett,
Attorney.

(No Model.) 6 Sheets—Sheet 2.
G. J. CAPEWELL & O. JONES.
HORSESHOE NAIL MACHINE.
No. 584,304. Patented June 8, 1897.
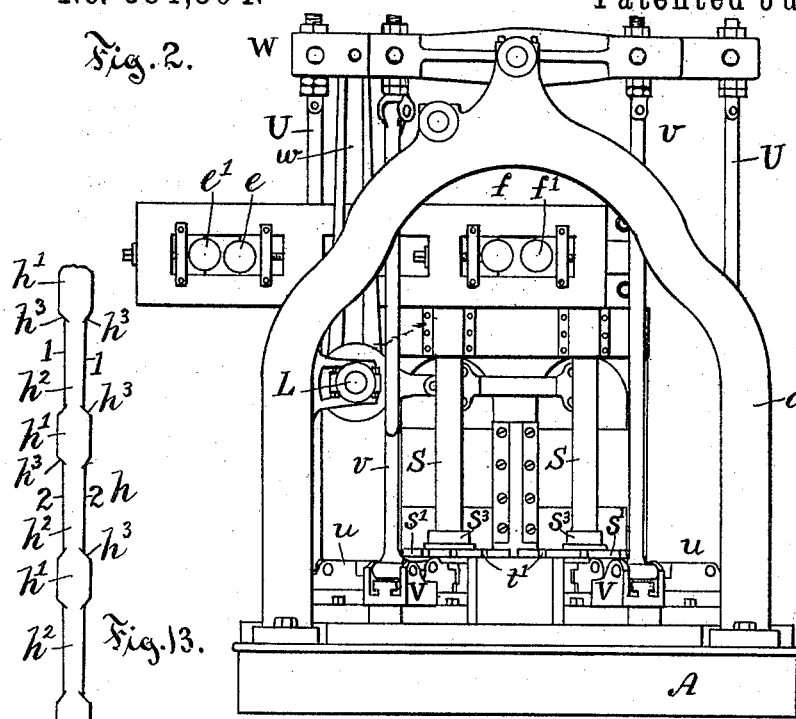
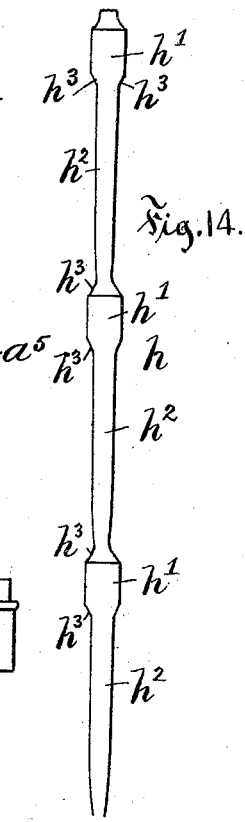
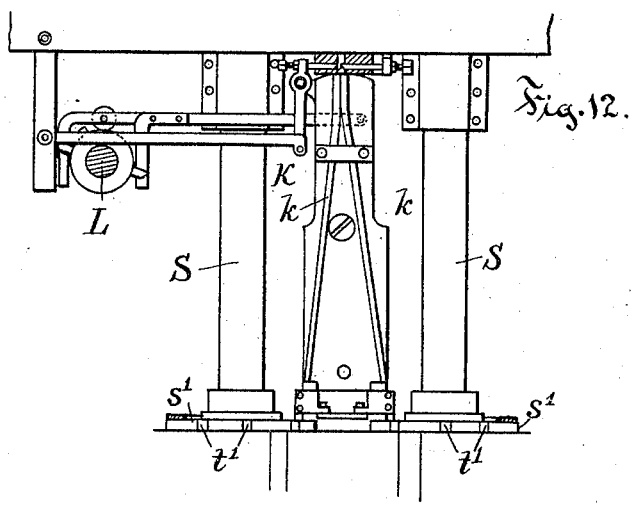
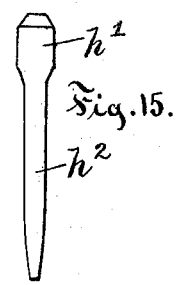
Witnesses:
J. A. Cantin
A. B. Jenkins
Inventors:
George Joseph Capewell
and Owen Jones
by Chas. L. Burdett,
attorney.

(No Model.) 6 Sheets—Sheet 3.

G. J. CAPEWELL & O. JONES.
HORSESHOE NAIL MACHINE.

No. 584,304. Patented June 8, 1897.

Witnesses:
J. A. Cantin
A. B. Jenkins

Inventors:
George Joseph Capewell
and Owen Jones
by Chas. L. Burdett,
Attorney

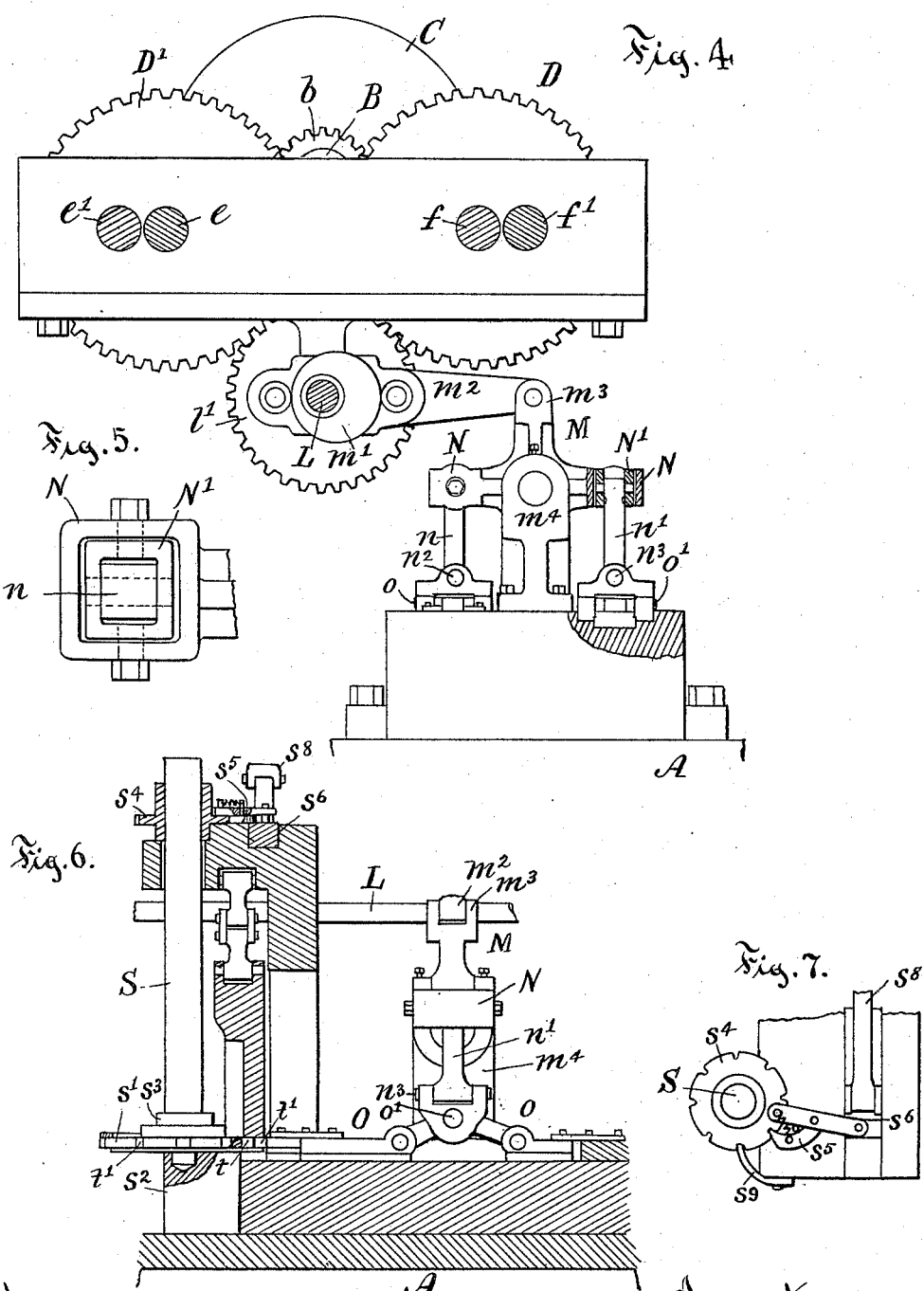

(No Model.) 6 Sheets—Sheet 5.
G. J. CAPEWELL & O. JONES.
HORSESHOE NAIL MACHINE.
No. 584,304. Patented June 8, 1897.
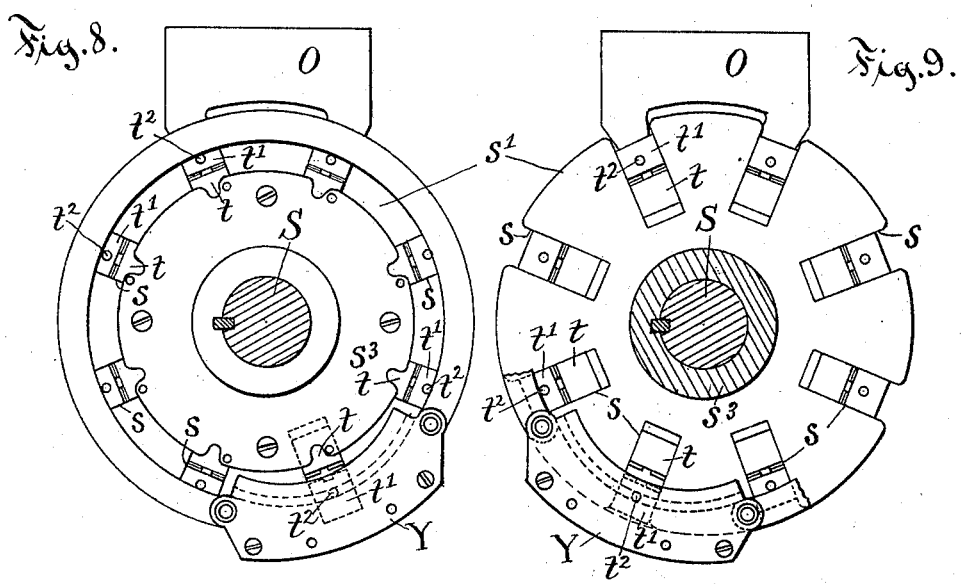
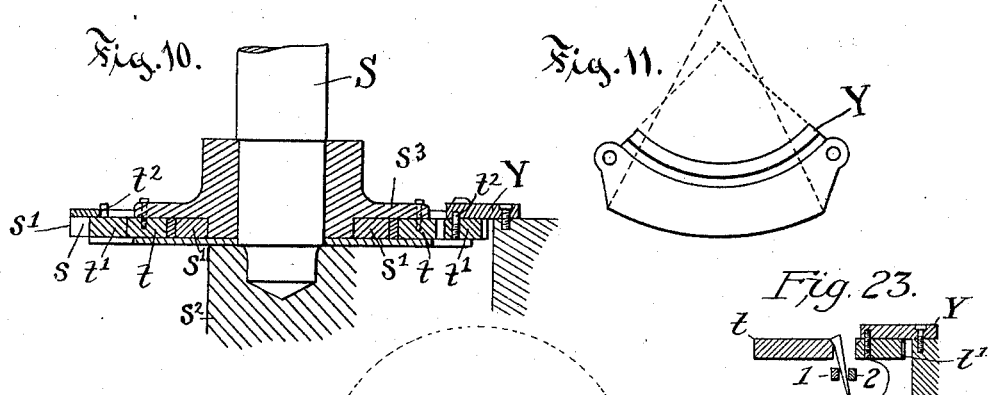
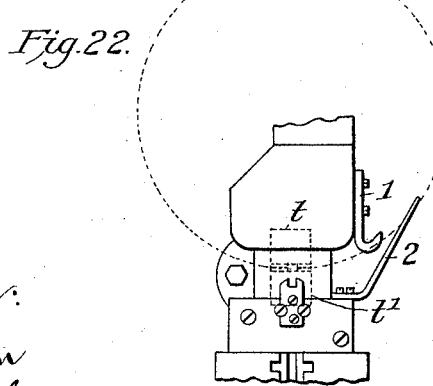
Witnesses:
J. A. Cantin
A. B. Jenkins.
Inventors:
George Joseph Capewell
and Owen Jones
By Chas. L. Burdett,
Attorney (No Model.) 6 Sheets—Sheet 6.
G. J. CAPEWELL & O. JONES.
HORSESHOE NAIL MACHINE.
No. 584,304. Patented June 8, 1897.
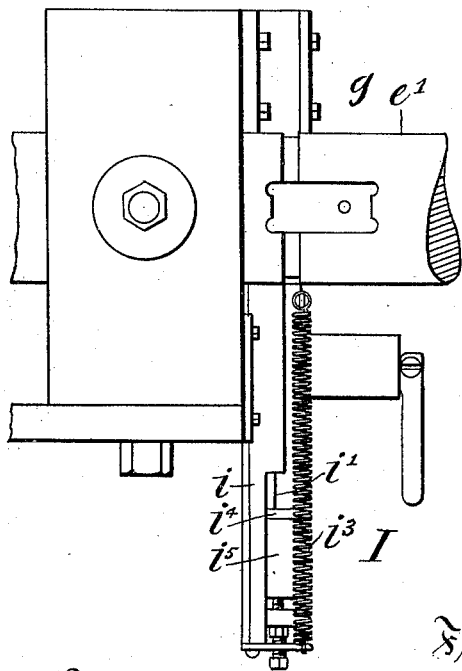
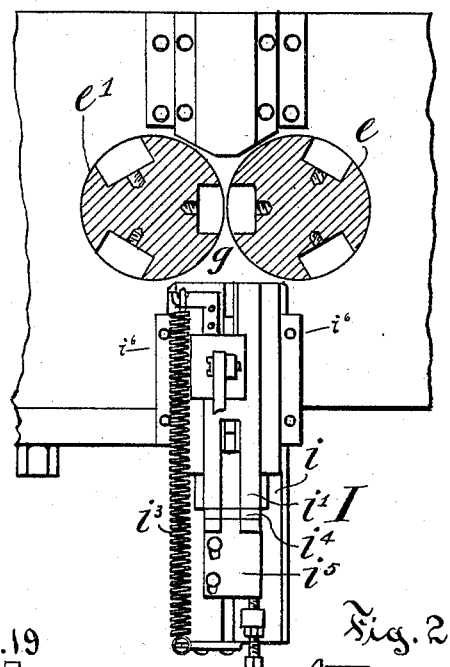
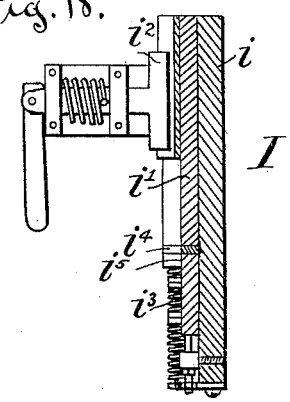
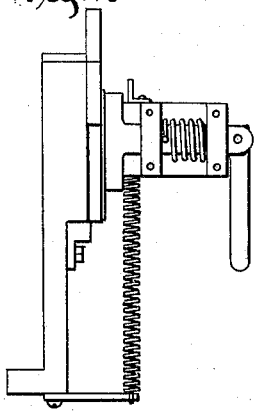
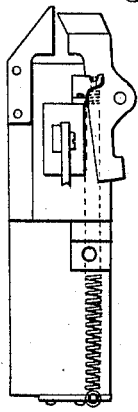
Witnesses:
J. A. Cantin
A. B. Jenkins
Inventors
George Joseph Capewell
and Owen Jones
By Chas. L. Burdett,
Attorney

UNITED STATES PATENT OFFICE.

GEORGE JOSEPH CAPEWELL, OF HARTFORD, CONNECTICUT, AND OWEN JONES, OF LONDON, ENGLAND, ASSIGNORS TO THE CAPEWELL HORSE NAIL COMPANY, OF HARTFORD, CONNECTICUT.

HORSESHOE-NAIL MACHINE.

SPECIFICATION forming part of Letters Patent No. 584,304, dated June 8, 1897.

Application filed June 25, 1894. Serial No. 515,565. (No model.)

*To all whom it may concern:*

Be it known that we, GEORGE JOSEPH CAPEWELL, a resident of Hartford, in the county of Hartford and State of Connecticut, and OWEN JONES, residing at No. 68 Great Russell Street, London, W. C., England, citizens of the United States, have invented certain new and useful Improvements in Horseshoe-Nail Machines, of which the following is a full, clear, and exact description, whereby any one skilled in the art can make and use the same.

The within-described invention relates to that class of machines for making nails in which each nail is formed from a continuous strip or length of nail-stock which is fed into the machine and subjected to the several operations, so that the blank may be discharged from the machine in a more or less finished condition.

The object of our invention is to provide a machine in which the several shaping operations may be performed by mechanism and in a manner that shall enable a greater quantity or number of nails to be produced in a given time than in prior machines of this class; and our invention consists in the details of the several parts making up the nail shaping and forming mechanism and in the combination of such parts, as more particularly hereinafter described, and pointed out in the claims.

Referring to the drawings, Figure 1 is a view in side elevation of the machine with the dies removed. Fig. 2 is a view in end elevation of the machine with the cutting mechanism and chutes removed. Fig. 3 is a plan view of the machine with the dies removed. Fig. 4 is a detail view, in vertical section, on the plane denoted by line $x$ $x$ in Fig. 1, partly in section and with parts removed beyond the line of section. Fig. 5 is a detail plan view of a toggle-joint. Fig. 6 is a detail view, in vertical section, of a portion of the front of the machine, showing the heading-die slides. Fig. 7 is a detail plan view showing the ratchet mechanism for rotating the shaft supporting the carrier-plate. Fig. 8 is a detail top or plan view showing the carrier-plate, the anvil-disk, the heading-die slide, and mechanism for opening and closing the dies. Fig. 9 is a like detail view with the anvil-disk removed. Fig. 10 is a detail view, in vertical central section, through the parts shown in Fig. 8. Fig. 11 is a detail view of the cam for opening and closing the dies. Fig. 12 is a detail view, in front elevation, showing the cutting device and chutes for conducting the blanks to the dies. Fig. 13 is a detail view showing a section of the blank. Fig. 14 is a detail view showing a section of the blank in an advanced stage of manipulation. Fig. 15 is a view showing a blank severed from the section and ready to be delivered to the chutes. Fig. 16 is a detail view in elevation, showing a controller. Fig. 17 is a detail view in section through the roll-shafts, showing the controller in a plane at right angles to that shown in Fig. 16. Fig. 18 is a detail view in section through the controller. Fig. 19 is a detail view showing another form of controller. Fig. 20 is a detail view in elevation of the controller shown in Fig. 19 and in a plane at right angles thereto. Fig. 21 is a detail view showing the manner in which the nail-rod arches over between the sets of roller-dies. Fig. 22 is a detail view showing a part of the mechanism located underneath the carrier-plate and showing the ejectors for forcing the nail from out of the sectional die, the line of separation between the dies and the dies being denoted in dotted outline. Fig. 23 is a detail diagram view in section through the dies, showing a nail being forced from the inner or stationary die. Fig. 24 is a detail diagram view illustrating the ejector forcing a nail from the outer or movable die.

In the form of our invention as illustrated in the within drawings, the machine comprises an assemblage of mechanisms and means for operating the moving parts which are preferred as affording the most desirable arrangement which provides for access to all of the moving parts.

In the within drawings the letter A denotes a base on which are secured or formed standards $a$, $a'$, $a^2$, $a^3$, $a^4$, and $a^5$. A driving-shaft B is supported in bearings on the standards $a$, $a'$, and $a^2$, and a pulley C is loosely mounted on the shaft, a clutch $d$ serving as a means of connecting the pulley to the shaft to impart motion to the latter. On this main shaft B is fast a cog-wheel $b$, which meshes with the larger cog-wheels D D′, which are secured to roll-shafts $e$ and $f$, located on opposite sides of the machine and extending lengthwise thereof in lines parallel to the axis of the driving-shaft as the machine is illustrated. These roll-shafts $e$ and $f$ are mounted in suitable journal-boxes or adjustable bearings in the frame, and these roll-shafts $e$ and $f$ are each arranged lengthwise and close alongside similar roll-shafts $e'$ and $f'$, respectively forming pairs, each of the roll-shafts in each pair being provided with dies inserted in the peripheries thereof and arranged to register with each other, so as to compress and shape the nail-stock, which is fed through between the dies. The roll-shafts $e'$ and $f'$ are driven by means of intermeshing cog-wheels $e^2 f^2$ and $e^3 f^3$, secured to the roll-shafts $e$ $f$ and $e'$ $f'$, respectively. There are six pairs of these roller-dies $g$, $g'$, $g^2$, $g^3$, $g^4$, and $g^5$.

The nail-stock H is fed from a reel $j$, supported in any convenient position, passes through a controller I, the function of which will be hereinafter explained, passes between the pair $g$ of roller-dies, by means of which the stock is compressed in part and an initial step taken in the shaping of the nail-blank. Passing from the pair of dies $g$ the nail-rod arches over, passes through another controller, and then enters between the roller-dies $g'$, the rod in extending between these two sets or pairs of dies changing its position ninety degrees—that is, if the nail-stock, which is slightly oblong in cross-section, is pinched edgewise in the first set of dies the rod changes its position, so that it is compressed widthwise between the next set of dies. The rod then turns in its passage through the dies, arches across, and comes up between the next pair of dies $g^2$, changing position ninety degrees, as before, in its passage between the dies. The stock then passes through each succeeding pair of dies $g^2$, $g^3$, $g^4$, and $g^5$; and then downward through a cutting device K, which then, for the first time, severs the blank from the rod of lengthened stock.

As soon as the blank $h$ has been cut from the stock it drops into a channel $k$ and is guided to the trimming and heading mechanism. The trimming and heading mechanism may form parts of separate machines, if desired, but for convenience in construction and operation the shaping, trimming, and heading mechanisms are all combined in the one structure and driven from a single main shaft.

The main shaft L extends lengthwise of the machine, a cog-wheel $l'$ being arranged in mesh with the cog-wheel D′ or otherwise positively connected with the driving-shaft, so as to be driven therefrom. This driving-shaft L bears a cam $m'$, by means of which a reciprocating motion is imparted to an arm $m^2$, which straddles the shaft and bears contact-pins preferably provided with antifriction-rollers which make contact with the surface of the cam. The outer end of the arm is pivoted to the stem $m^3$ of a T-shaped lever M, which is pivoted to the standard $m^4$, fast to the bed of the machine. The outer ends of the cross-arm of this lever M are each connected by a universal joint consisting of members N N′ and links $n$ $n'$ to toggles $o$. The universal joint in the form shown resembles a gimbal, the outer end of the lever-arm having an opening in which is pivoted a rectangular frame which in turn is pivoted to the upper end of the link, the lower end of each of the links being pivotally connected by pivots $n^2$ $n^3$, and pivots $o'$, arranged at right angles thereto, to the toggles $o$. One member of each of these toggles is anchored to the bed so that a movement across a line drawn through the pivots of the toggle-joints causes a reciprocating movement of the toggle-slide held in ways in the bed. The front end of each of these toggle-slides is connected to or forms a socket for a die. These slides just described are the heading-die slides, similar slides, operated by link motions, forming parts of the beveling and shearing dies.

In forming the horseshoe-nail the strip or rod of metal, which is oblong in cross-section, is first compressed edgewise between the roller-dies $g$ after passing through the controller I, as stated. When the leading end of the nail-rod is passed between the dies, their first operation compresses the rod and forms two series of recesses 1 1 and 2 2 in opposite edges of the rod. These terminate with shoulders which form the limits of that part of the stock left for the head portion $h'$, while the narrower portion $h^2$ forms the shank of the nail.

When the stock is allowed to be drawn through between the rolls by the action of the dies simply, it is difficult to gage the length of the nail-blank and provide each time the requisite length for the head-section $h'$ and shank or blade $h^2$. It is the function of the controller to assist in gaging the length of each blank at its initial step. The controller I includes a base-piece $i$, a sliding carriage $i'$, a clamp $i^2$, and a spring $i^3$. The carriage is arranged to have a reciprocating motion in a line toward and from the opening between the dies and in alinement with the rod H as it passes through between the working faces of the dies. The clamp $i^2$ serves to hold the rod with a yielding grasp sufficient to enable the carriage in its return movement to draw the stock back, but not sufficient to prevent the rod from being drawn through the clamp by the force exerted by the roller-dies in shaping the blank.

The base-piece $i$ of the controller is secured to the frame of the machine by plates $i^6$, located on opposite sides thereof, bolts passing through the parts to firmly secure them to the frame, as shown in Figs. 16 and 17 of the drawings.

The roller-dies are arranged in peripheral sockets in the roll-shafts, but channels in the shafts are formed between the dies to enable the rod to move freely between the rolls when the dies are not in operation to compress the rod.

The first operation of the first set of forming-dies $g$ is, as stated, to form two series of recesses 1 and 2, and as soon as these are formed the recoil of the spring $i^3$ draws the rod back a distance sufficient to locate the shoulders $h^3$ in the path of movement of the leading edge of the dies, which strike the shoulder simultaneously on opposite sides and draw and feed the rod forward again against the grasp of the clamp, this backward pull or drag upon the rod insuring a second rolling of each blank from the second one on the rod throughout the rest of the series, the shoulder, in connection with the leading edge of the die, forming a gage which accurately determines the length of the shank 2 and also the length of the succeeding head-section of the nail-blank. A buffer is provided in the controller for the carriage $i$, and for this purpose a strip or block of elastic material, as leather, is used to form the elastic buffer $i^4$, a fixed part of the base serving as an abutment for the buffer to rest upon.

The abutment $i^5$ may be made adjustable, if desired, and a feed-screw provided for varying its position, so as to obtain the correct amount of movement in gaging the recoil movement of the carriage and, consequently, the proper position of the shoulder to be encountered by the leading edge of the die.

By means of the roller-dies, as described, the nail-rod H is formed into a continuous length of blanks, as shown in Fig. 13, each complete as to a head-section and a shank-section, the latter being shaped by compression to the desired size, taper, and length, but such blanks are not cut from the rod to be further formed as to the head and point to complete the nail until after passage between the last pair of roller-dies.

There are two sets of mechanisms for the purpose of forming the head and pointing each nail embodied in the machine illustrated, and a description of one set will apply to all.

As soon as a nail-blank is cut from the rod it passes into a guide-channel $k$, preferably by the action of gravity, and is delivered point first into the grasp of a sectional die $t$, which is borne in a socket $s$ in the periphery of a carrier-plate $s'$. As illustrated in the drawings, a vertical shaft S is supported on a massive step-bearing $s^2$ and adapted by connected mechanism to be rotated with an intermittent motion. This shaft S supports an anvil-disk $s^3$, to which the carrier-plate $s'$ is secured or of which it forms a part. The peripheral die-sockets $s$ are located at regular intervals about the edge of the carrier-plate, and the sectional dies $t$ are located in such sockets, the outer section $t'$ of each die being capable of a sliding motion on the floor of its socket, so as to open and close the die-sections to deliver a nail from the grasp of the dies or to bind a blank firmly while the head is being formed or loosely when a point is shaped on the blank.

Beveling and trimming mechanisms are located at suitable intervals on the base of the machine adjacent to the edge of the carrier-plate and in the plane of the anvil-disk, as described with regard to the heading mechanism. These mechanisms consist of a system of toggles and links constructed in a manner similar to that described with reference to the heading mechanism hereinbefore fully described, and for this reason a further description herein is deemed unnecessary further than to say that the die-slides in each instance have their faces properly formed for the work to be done by each.

For the first operation to which a nail-blank is subjected while held in the carrier-plate it is located during one of the dwells in the rotary movement of shaft S between the sections of the die $t$ into which it fell from the guide-channel and in line with the heading-die slide. The forward movement of this slide O closes the die-sections firmly together and holds the nail-blank while the hammer descends and shapes the head. The heading-die slide O is arranged to operate a pair of dies in the form of machine illustrated in order to enable one set of dies to partly shape or form the head, while in the next position and at the next pause in the intermittent rotary movement of the carrier-plate the same nail-head will be held below the hammer in position to be further shaped to final form. It is not essential that the heading-dies should be arranged so as to enable the head to be subjected to two operations, but it is a matter of convenience to enable the machine as a whole to be adapted to various kinds of work and to the making of nails with heads of varying shapes, if desired.

The nail-blank, after having the head formed as stated, is moved into position to be subjected to the operation of the beveling-die, the slide $u$ being forced forward by a system of toggle-joints, the slide and toggle being of a construction similar to those appurtenant to the heading-dies hereinbefore described and are operated by the rods U, connected with the rocking frame W, which is driven from the main shaft, to which it is connected by a rod $w$. At a succeeding pause in the rotary movement of the carrier-plate the point of the nail is formed by the shearing operation of the trimmer-dies, the trimmer-slide being similar to and operated by a similar set of toggles and connecting-rods $v$, as has been described with reference to the heading and beveling die slides.

After the completion of the heading, beveling, and pointing operations the nail is discharged from the carrier-plate. A preferred form for accomplishing this includes a cam Y, which is formed in a block or ring secured to the frame and on a curve struck from a center eccentric to that on which the carrier-plate turns. The cam is so placed as to lie in the direct path of rotary movement of a pin $t^2$, projecting from the upper surface of the outer section of the separable die and so curved outward as to draw the outer section of the die away from the inner section to open the die parts. A suitable ejector strikes the nail and discharges it from the carrier-block. The cam from that point onward curves in toward the axis of the carrier-block and by its operation closes the outer die-section against the inner, but not so closely as to prevent a nail-blank from dropping into place between the die-sections as soon as the die is located in proper position to receive the nail-blank from the guide-channel at the next pause in the rotary movement of the carrier-plate.

A form of ejector for forcing the nails out of the dies is shown in Figs. 22, 23, and 24 of the drawings herein. In Fig. 22 the mechanism located underneath the sectional dies is shown, but a description of the same is not deemed necessary herein, as it forms no part of the invention with the exception of affording supporting means for the ejectors 1 and 2. These ejectors consist of arms secured to removable parts of the machine, these arms projecting obliquely across the circular path of movement of the lower end of a nail held between the dies. If the nail should adhere to the inner or stationary die, in the rotation of the carrier-plate $s'$ the nail will come in contact with the ejector 1 and force it out of the die. If a nail should adhere to the outer or movable section $t'$ of the die, as this die is moved outward the point of the nail would pass beyond the end of the ejector 1 and come in contact with the ejector 2 and be forced from the die.

In order to provide for the discharge of the nail-blanks alternately to each of the carrier-plates, the guide-channel is connected to a slide to which movement is imparted, so that a nail-blank will drop first to one side of the switch and then on the other, falling into the respective channels appurtenant to the several carrier-plates.

The dies are backed against an abutment formed by the anvil-disk, the thrust of the several slides against the die-section being in a plane across the axis of the shaft, which is made of sufficient strength to resist the strain and to enable the several heading, beveling, and pointing operations to be performed either simultaneously by the several dies and on separate blanks or in quick succession without any undue strain being thrown upon the shaft.

The intermittent rotary movement of the shaft is preferably imparted by means of a ratchet and pawl, a ratchet-wheel $s^4$ being secured to the shaft and a pawl $s^5$ borne on the slide $s^6$, a reciprocating motion being imparted to the slide by an eccentric $s^7$ on the main shaft and connected by the rod $s^8$ to the pawl-slide. A suitable spring-pawl $s^9$, secured to the frame, with its free end engaging a ratchet-tooth in the ratchet-wheel, prevents the return rotary movement of the shaft when the feed-pawl is disengaged and moves back to engage another tooth for the next forward feeding motion of the shaft.

Other suitable devices for producing an intermittent rotary movement of the shaft may obviously be employed in place of the ratchet-and-pawl device.

There is a controller appurtenant to each pair of roller-dies, but they are provided with an inelastic stop differing in that regard from the buffer used in the controller appurtenant to the first pair of roller-dies.

We claim as our invention—

1. In combination, a plural number of sets of opposing roll-shafts, a plural number of pairs of roller-dies arranged in each set of roll-shafts, each pair of dies in each set of roll-shafts being adapted to operate upon a continuous rod of stock, whereby said rod after being once acted upon by one set of roll-shafts returns thereto for further action.

2. In combination in a horseshoe-nail machine, a pair of roll-shafts, registering roller-dies borne by such shafts, freeways formed in line between the dies, and a spring-retained controller provided with a clamp for holding the nail-stock but permitting movement of the stock therethrough, the controller retracting the stock a predetermined distance in its passage between the dies, all substantially as described.

3. In combination in a horseshoe-nail machine, a pair of roll-shafts, registering roller-dies borne by such shafts, freeways formed in line between the dies, and a spring-retained controller provided with a clamp for holding the nail-stock but permitting movement of the stock therethrough, the controller retracting the stock a predetermined distance in its passage between the dies, and an elastic buffer arranged in rear of the clamp-carriage of the controller, all substantially as described.

4. In combination in a horseshoe-nail machine, a series of roller-dies combined and arranged in pairs and adapted to roll the stock alternately on opposite sides, a plural number of rotary carrier-disks with peripheral die-sockets, sectional dies borne in said sockets, a guide-channel adapted to deliver nail-blanks to the several dies, heading-dies, and point-forming dies arranged about the periphery of the carrier-disk, the die-opening mechanism, and an ejector, all substantially as described.

5. In combination with roller-dies for forming the head and shank portions of a horseshoe-nail, a rotary shaft bearing an anvil-disk and carrier-plate, peripheral die-sockets in the carrier-plate, sectional dies supported in said sockets with the opening between the dies transversely of the plane of the carrier-plate, the die-closing slides located in the plane of the carrier-disk, the slide-operating mechanisms, the several head-forming and point-forming dies located at intervals about the periphery of the carrier-disk, the die-separating device, and the nail-ejector, all substantially as described.

6. In a horseshoe-nail machine, in combination, roller-dies for forming the head-section and shank-section of a nail-blank, an upright shaft bearing an anvil-disk, a carrier-plate with peripheral die-sockets, sectional dies located in said sockets, heading, beveling and shearing devices arranged about the periphery of the carrier-plate, the outer section of each die having a projecting part adapted to engage a die-opening cam, the die-opening cam with its ends arranged in the path of movement of the projection on the die-section, and its central portion curved outward whereby the outer die-section is reciprocated to open and close the dies, all substantially as described.

7. In a machine for making horseshoe-nails, horizontal roll-shafts arranged in pairs in the frame of the machine, a plural number of pairs of registering roller-dies arranged in each of the pairs of roll-shafts, each pair of dies in each set of roll-shafts being adapted to operate upon a continuous rod of stock whereby said rod after being once operated upon by one set of shafts returns thereto for further operation, the pairs of dies in each set having such relation to the next preceding pair that stock passed between pairs of dies is compressed on different sides alternately.

8. In a machine for making horseshoe-nails, the horizontal roll-shafts arranged in pairs in the frame of the machine, a series of registering roller-dies arranged in pairs in the several roll-shafts and adapted to shape a rod of nail-stock fed vertically through the dies, and alternately between the pairs in opposite sets of roll-shafts, the spring-retracted controller appurtenant to the first series of roller-dies and having an elastic buffer to receive the impact or recoil of the controller, each pair of succeeding dies having also appurtenant to them a spring-retracted controller, and the cutting device for severing a nail-blank formed as to the head-section and shank-section on its passage from between the last set of dies, all substantially as described.

9. In combination with a pair of roll-shafts, registering roller-dies borne by such shafts, freeways formed in line between the dies, a controller provided with means for retracting the stock a predetermined distance in its passage between the dies, but permitting automatic movement of the stock through the controller, and a buffer for receiving the recoil of the carriage on the controller, all substantially as described.

10. In combination in a horseshoe-nail machine, a blank-feeding device, a vertical shaft with means for rotating it, an anvil-disk and carrier-plate secured to said shaft, peripheral die-sockets formed in the carrier-plate, sectional dies supported in said sockets, the die-closing slides located in the plane of the carrier-slide, the slide-operating mechanisms, the several head-forming and point-forming dies located at intervals about the periphery of the carrier-disk, the die-separating device, and the nail-ejector, all substantially as described.

11. In combination, two sets of operating roll-shafts, a plural number of pairs of roller-dies arranged in each set of roll-shafts, the sets of dies in each pair of roll-shafts operating alternately on a continuous rod of stock passed between each set of shafts.

12. In combination, two sets of operating roll-shafts, a plural number of pairs of roller-dies arranged in each of said sets, the pairs of dies in each set operating alternately on a continuous rod of stock, each pair of dies having such relation to the preceding pair of dies that stock passed between successive pairs of dies in the series may be compressed on different sides alternately.

13. In combination, in a horseshoe-nail machine, a pair of roll-shafts, registering roller-dies borne by such shafts, freeways formed in line between the dies and a spring-retained controller provided with a frictional clamp for holding the nail-stock whereby said stock is permitted automatic movement through the clamp the controller retracting the stock a predetermined distance in its passage between the dies.

GEORGE JOSEPH CAPEWELL.
OWEN JONES.

Witnesses:
ARTHUR B. JENKINS,
JOSEPH ARTH. CANTIN.